(No Model.)
J. C. HOLLOWAY, Sr.
VEHICLE HUB.
No. 347,426. Patented Aug. 17, 1886.
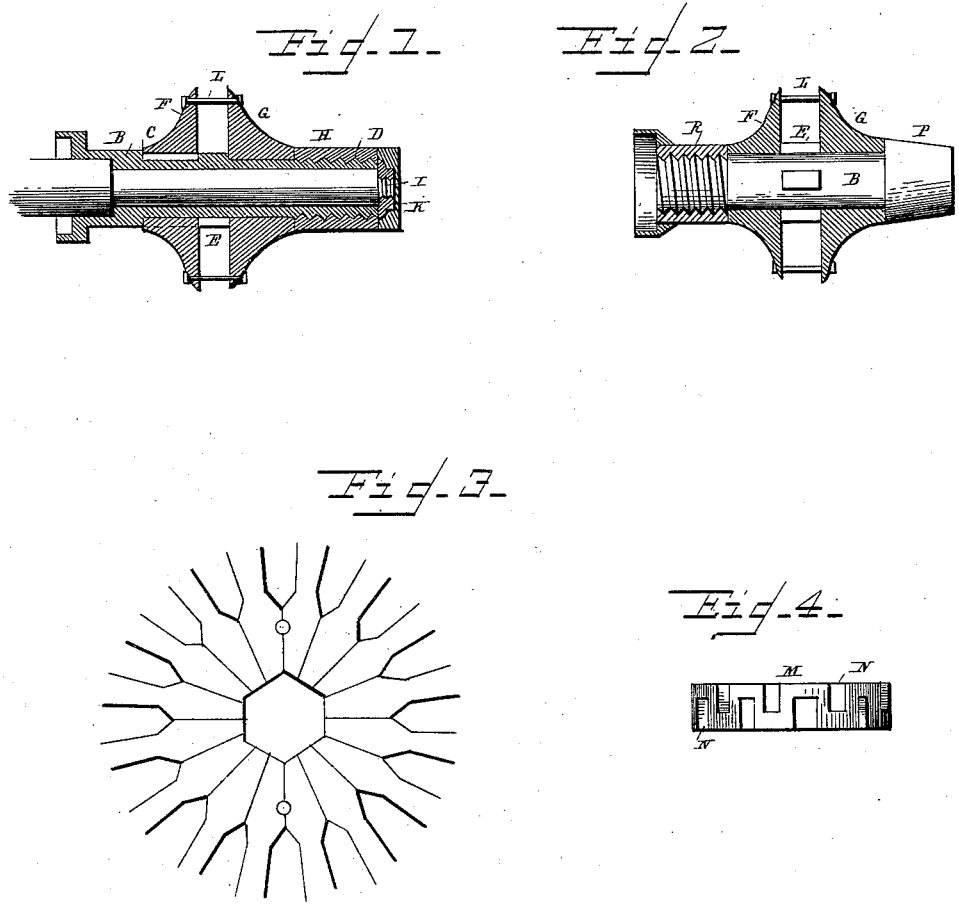

United States Patent Office.

JOSEPH CRITTENDEN HOLLOWAY, SR., OF EDDYVILLE, KENTUCKY.

VEHICLE-HUB.

SPECIFICATION forming part of Letters Patent No. 347,426, dated August 17, 1886.

Application filed September 26, 1885. Serial No. 178,215. (No model.)

*To all whom it may concern:*

Be it known that I, JOSEPH CRITTENDEN HOLLOWAY, Sr., a citizen of the United States, residing at Eddyville, in the county of Lyon and State of Kentucky, have invented certain new and useful Improvements in Hubs; and I do hereby declare the following to be a full, clear, and exact description of the invention, such as will enable others skilled in the art to which it appertains to make and use the same.

My invention relates to improvements in hubs, and is designed to produce a hub in which the spokes may at any time be easily and quickly applied, and also removed without trouble.

The hub is simple and substantial in construction and provides a means whereby the parts may be tightened should they from any cause become loosened or replaced should they be broken.

In the drawings, Figures 1 and 2 are similar sectional views of my invention. Fig. 3 is a side view of the inner ends of the spokes, and Fig. 4 is a view of the filling-ring.

In Fig. 1 the axle-spindle is shown at A, and is surrounded by a sleeve, B, which forms the eye of the hub. The inner end of the said sleeve is provided with an annular shoulder, C, and the outer end is screw-threaded, as at D. About midway between the shoulder C and threaded portion D are raised the lugs, flanges, or shoulders E. A collar, F, preferably of general triangular shape in cross-section, is passed over the sleeve B till it abuts against the shoulder C, recesses being provided for its passage over the lugs or flanges E, and extends from the said flanges to the said shoulder. A similar collar, G, is then passed over the sleeve till it abuts against the outer edges of said lugs or flanges. Over the threaded portion D is then passed a nut, H, preferably six or eight sided, and screwing on the sleeve in a direction contrary to that in which the wheel turns when in motion, thus causing said motion to tend to tighten or hold said nut in place. On the screw-threaded continuation I of the axle-spindle is placed the retaining-nut K, usually used for retaining the hub in place. The spokes are placed between the collars F and G, and kept from turning on the sleeve by the flanges or projections E. The collar F having been turned sufficiently to carry the grooves therein beyond said flanges, securing-bolts L are passed through the said collars near their outer edges and hold them firmly. By placing a shell, M, between the collars the spokes may be made to alternate. The recesses N, forming the spoke-seats, enter alternately from the sides of said shell.

In Fig. 2 the sleeve B is shown in elevation and has at its outer end an annular shoulder, P, in place of the nut H. The sleeve G is grooved to pass over the flanges E and abuts against the said shoulder P. The inner end of the sleeve B is threaded and carries a nut, R, for retaining the sleeve F in place.

The varied modes of inserting and securing the spokes are alike applicable to the modified forms of the hub. One of the collars forms an abutting collar for the spokes, while the other collar is movable and adjustable to clamp the said spokes.

I claim—

1. The combination, with the sleeve having the integral spoke-seats, of the removable hub-sections, one of which is adapted to pass over the spoke-seats and engage a nut or shoulder on the inner end of the said sleeve, and the bolts passing through the spokes and connecting the hub-sections, substantially as specified.

2. The combination, with the sleeve having the integral spoke-seats, of the removable hub-sections, one of which is adapted to pass over the spoke-seats, the bolts passing through the spokes and connecting the hub-sections, and the removable filling-ring M, having alternate edge recesses, substantially as specified.

In testimony whereof I affix my signature in presence of two witnesses.

JOSEPH CRITTENDEN HOLLOWAY, SR.

Witnesses:
J. W. CLARK,
R. C. WILCOX.